(12) United States Patent
Nakamura et al.

(10) Patent No.: US 6,351,594 B1
(45) Date of Patent: Feb. 26, 2002

(54) LINEAR BEAM IRRADIATOR HAVING A VARYING CROSS-SECTIONAL SIZE

(75) Inventors: Tetsuro Nakamura, Hyogo-ken; Eiichiro Tanaka; Takahiko Murata, both of Osaka-fu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/034,761

(22) Filed: Mar. 4, 1998

(30) Foreign Application Priority Data

Mar. 4, 1997 (JP) .............................. 9-048655
Aug. 29, 1997 (JP) ............................. 9-234330

(51) Int. Cl.[7] ................................................ F21V 8/00
(52) U.S. Cl. ........................ 385/146; 362/558; 385/31; 385/901
(58) Field of Search ........................ 385/31, 33, 36, 385/37, 43, 133, 146, 147, 901; 362/31, 555, 558–560

(56) References Cited

U.S. PATENT DOCUMENTS

| 5,050,946 A | * | 9/1991 | Hathaway et al. ............ 385/33 |
| 5,237,641 A | * | 8/1993 | Jacobson et al. ............ 385/146 |
| 5,467,417 A | * | 11/1995 | Nakamura et al. ............ 385/36 |
| 5,664,862 A | * | 9/1997 | Redmond et al. ............. 362/31 |
| 5,764,322 A | * | 6/1998 | Mamiya et al. ......... 385/901 X |
| 5,860,722 A | * | 1/1999 | Tai et al. ........................ 362/31 |
| 5,926,601 A | * | 7/1999 | Tai et al. ..................... 385/146 |
| 6,044,196 A | * | 3/2000 | Winston et al. ............. 385/146 |

FOREIGN PATENT DOCUMENTS

| EP | 0 607 930 A3 | | 7/1994 | |
| EP | 0 760 577 A2 | | 5/1997 | |
| JP | 64-11203 | * | 1/1989 | ................ 385/901 |
| JP | 6-180009 | | 6/1994 | |
| JP | 8-43633 | * | 2/1996 | |

* cited by examiner

*Primary Examiner*—John D. Lee
(74) *Attorney, Agent, or Firm*—McDermott, Will & Emery

(57) ABSTRACT

The present invention relates to a linear beam irradiator, more specifically to a linear beam irradiator for using light conductor, comprising a light conductor having light permeability, a light refraction & reflection area 2 provided on one side face in the longitudinal direction of said light conductor, and a light source 8 provided in a way to cover the light refraction & reflection area 2, as well as a light source disposed at one end or both ends of said light conductor. This construction makes it possible to irradiate a linear light beam from the other side face of the light conductor corresponding to said light refraction & reflection area 2. With this construction, it becomes possible to reduce the deviation of illuminance of said linear light beam, sharply improve the transmission efficiency of light and greatly reduce the number of LED chips disposed at the light source. Moreover, this also enables a cost reduction.

59 Claims, 13 Drawing Sheets

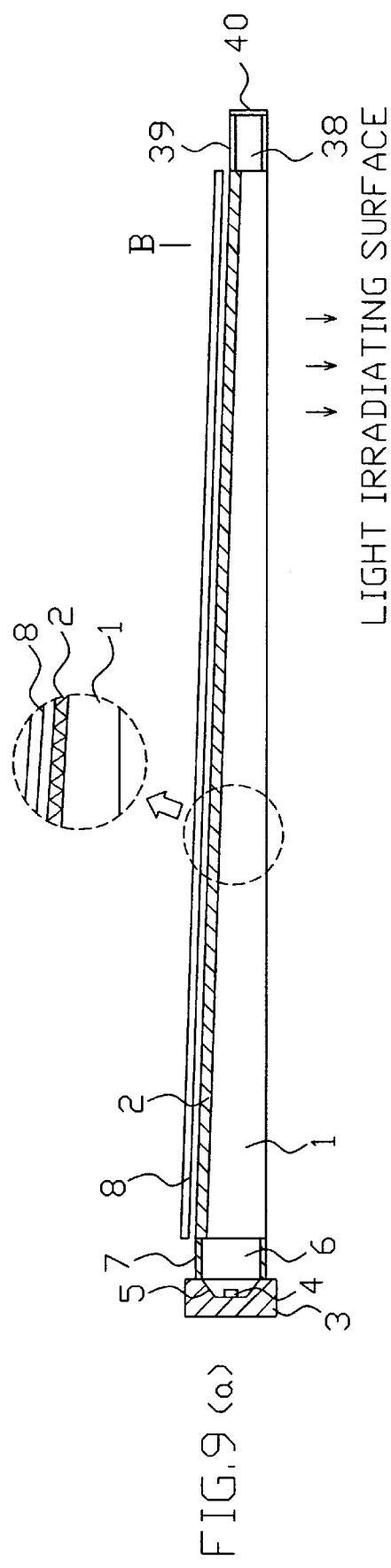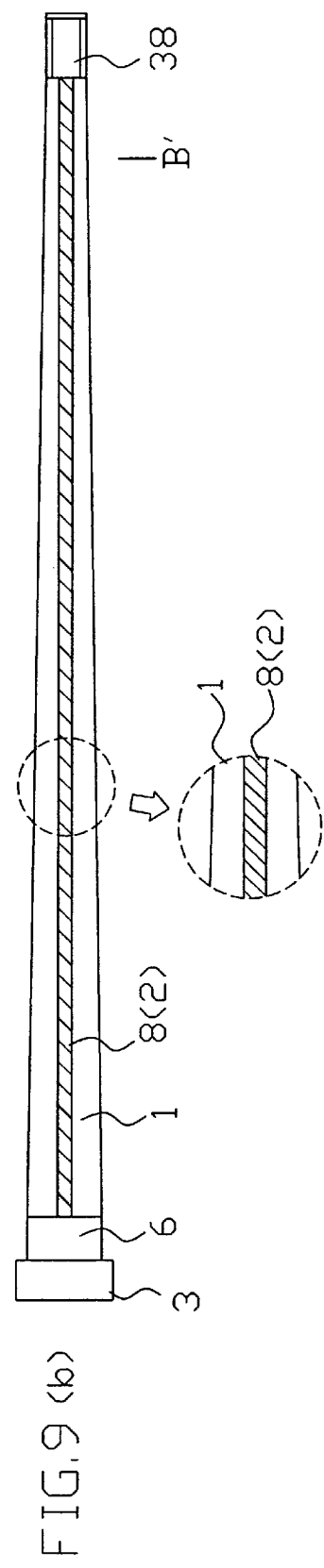

LINEAR BEAM IRRADIATOR HAVING A VARYING CROSS-SECTIONAL SIZE

FIELD OF THE INVENTION

The present invention relates to a linear beam irradiator for irradiating the surface of an original sheet in the main scanning direction on an optical image reader, for example.

BACKGROUND OF THE INVENTION

A conventional linear beam irradiator is explained by taking an optical image reader as example for the sake of convenience.

In recent years, an optical image reader came to be widely used as for a reading unit for a facsimile, scanner, barcode reader, etc., and LED array realized by disposing LED chips in linear shape is used as original irradiating means of this kind of equipment.

FIG. 14 shows a structural drawing of a conventional optical image reader. In FIG. 14, the original sheet 51 (hereinafter referred to "original 51") is irradiated by a LED array 52 used as original irradiating means, and the light reflected on this original 51 is converged by a rod lens array 53, and input in a photoelectric converting element array 54, to be converted into an electric signal.

Here, the distance from the photoelectric converting element array 54 to the original 51 is usually 10 mm or so, and the respective rod lenses constituting the rod lens array 53 have a columnar shape of 0.6 $\phi$mm or so.

FIG. 15 indicates the construction of a conventional LED array, which is constructed by arranging a plural number of LED chips 62 linearly on a printed circuit board 61 forming the conductive layer of a circuit. Usually, 24 to 32 pieces of LED chip 62 are disposed on one printed circuit board. One piece of LED chip 62 has a length of about 2 mm, and the respective LED chips 62 are arranged at intervals of 5 mm or so.

Moreover, the Japanese patent laid-open publication No. 6-180009 discloses an original irradiating means of a construction realized by disposing a light source at both ends or at an end of a light conductor, to transmit the light from the light source through said light conductor. With this construction, it becomes possible to form a light diffusing area such as chopping wave surface, for example, on one side face in the longitudinal direction of the light conductor, so as to irradiate a concentrated linear beam from the other side face in the longitudinal direction.

By the way, while a original irradiating means works all right if only a linear light beam is obtained in the scanning direction, said construction using LED array has a defect of lowering the irradiation efficiency because the LED chips 62 also diffuse light in the subscanning direction respectively. Moreover, since the LED chips are provided at prescribed intervals, this not only produces deviation of illuminance on the surface of the original, requiring processing such as correction of shading, etc. but also deteriorates the image reading performance of the image reader itself even with such processing. Furthermore, in order to keep the deviations of illuminance on the surface of the original to a minimum, it is necessary to keep a certain distance between the original 51 and the LED array 52, which would require a larger number of LED chips, expand the size of the unit itself and increase cost.

In addition, this interface of the chopping wave which is disclosed in the Japanese patent laid-open publication No. 6-180009 is covered with air of an index of refraction lower than that of the light conductor. Therefore, the light irradiated on said interface of the chopping wave among the light transmitting through the light conductor is totally reflected inside the light conductor to eventually go out from the other side face. However, since the entire light doesn't necesarily reflect back to the inside of the light conductor so a portion of light leaks to outside the light conductor, deteriorating the transmission efficiency.

The object of the present invention is to provide a linear beam irradiator capable of controlling deviation of illuminance on the surface of the original, without reducing the irradiation efficiency of the LED array. Another object is to provide a small-sized linear beam irradiator with shortened distance between the light irradiating surface and the original. Still another object is to provide a linear beam irradiator capable of drastically improving the transmission efficiency of light and sharply reducing the number of LED chips. Yet another object is to provide a low-cost linear beam irradiator.

SUMMARY OF THE INVENTION

To achieve said objects, the present invention adopts the following means: First, the present invention presupposes a linear beam irradiator comprising a light conductor 1 having light permeability, a light refraction & reflection area 2 provided on one side face in the longitudinal direction of said light conductor 1 and a light source on the surface at both ends of said light conductor 1. By this construction, the light emitted from said light source gets into the light conductor 1, is refracted or reflected in said light refraction & reflection area 2, and goes out in the form of linear beam from the other side face in the longitudinal direction opposing said light refraction & reflection area 2.

In said linear beam irradiator, the present invention is constructed by comprising said light refraction & reflection area 2 composed of a large number of interface of the chopping wave, and a diffusing surface 8 provided in a way to cover the light refraction & reflection area 2. By this construction, the light which entered in the parts other than said light refraction & reflection area 2 of the light conductor 1, is transmitted through the light conductor 1 while repeating total reflection on the inner face of this light conductor 1, to eventually enter the light refraction & reflection area 2 and go out in the form of linear beam from the outgoing surface. At that time, since the light refraction & reflection area 2 is composed of a large number of interfaces of chopping wave, the light which entered the light refraction & reflection area 2 is reflected downward and goes out from the outgoing surface, thus going out efficiently. Moreover, even in the case where the light which entered said light refraction & reflection area 2 is transmitted through this light refraction & reflection area 2, it is reflected back to the inside of the light conductor 1 by the diffusing surface 8 formed on the light refraction & reflection area 2, and can form a linear beam efficiently.

If said diffusing surface 8 is disposed across a space (air layer, for example) not optically matching with said light refraction & reflection area 2, the amount of light directly entering said diffusing surface 8 decreases and the efficiency improves.

The shape of said light conductor 1 is decided in such a way that the sectional area gradually diminishes from both ends toward the center. In this case, a light source is disposed at both ends of said light conductor 1. Moreover, the shape of said light conductor 1 may also be decided in such a way that the sectional area gradually diminishes from one end toward the other. In that case, a light source will be disposed at an end of said light conductor 1, and a light terminal 38 will be provided at the other end as construction.

The other side face in the longitudinal direction irradiating the light of said light conductor 1 must be a plane perpendicular to both end faces of said light conductor 1. Thus the surface irradiated with light such as original paralles the other side face (light irradiating surface).

The sectional shape of said light conductor 1 can be circular, elliptical, etc. In the case where a light conductor 1 with an elliptical sectional shape is used, the light refraction & reflection area 2 is preferably disposed on the focal point on one side of the ellipsis. Moreover, said light conductor 1 may also have a sectional shape formed by combining 2 circles of different diameters. In that case, the circle with larger diameter will be furnished with the light transmitting function, while the circle with smaller diameter will have the light irradiating function.

To efficiently conduct the light emitted from said light source to the light conductor 1, a connecting part 6 is provided between the light source and the light conductor 1. Here, the connecting part 6 shall preferably be arranged in such a way that the incident light from the light source at both ends of the light conductor 1 has a length in longitudinal direction and a diameter satisfying the conditions of total reflection at the inner face of the light conductor 1.

In the case where the sectional area is made to gradually diminish from one end toward the other, a light terminal 38 for treating the light which reached the other end is disposed. This light terminal 38 will be constructed by comprising, at the outer circumference and the end face, a light shielding layer for shielding the light from outside or a light diffusing layer for diffusing light or a light reflecting layer for reflecting light.

Said light source, formed on a concave reflecting face 5, will be constructed by disposing a light emitting diode on a printed circuit board. Said light emitting diode and said connecting part 6 will be made of transparent resin having one same index of refraction as said light conductor 1, and said light emitting diode or said light conductor 1 will be connected in a way to optically match with each other.

BRIEF DESCRIPTION OF THE DRAWINGS

FIGS. 9(a)–9(b) are respective side sectional view and a plan view of the linear beam irradiator according to the second embodiment of the present invention.

EMBODIMENTS OF THE INVENTION (First embodiment)

The first embodiment of the present invention is explained hereafter with reference to drawings.

Figure 1A:
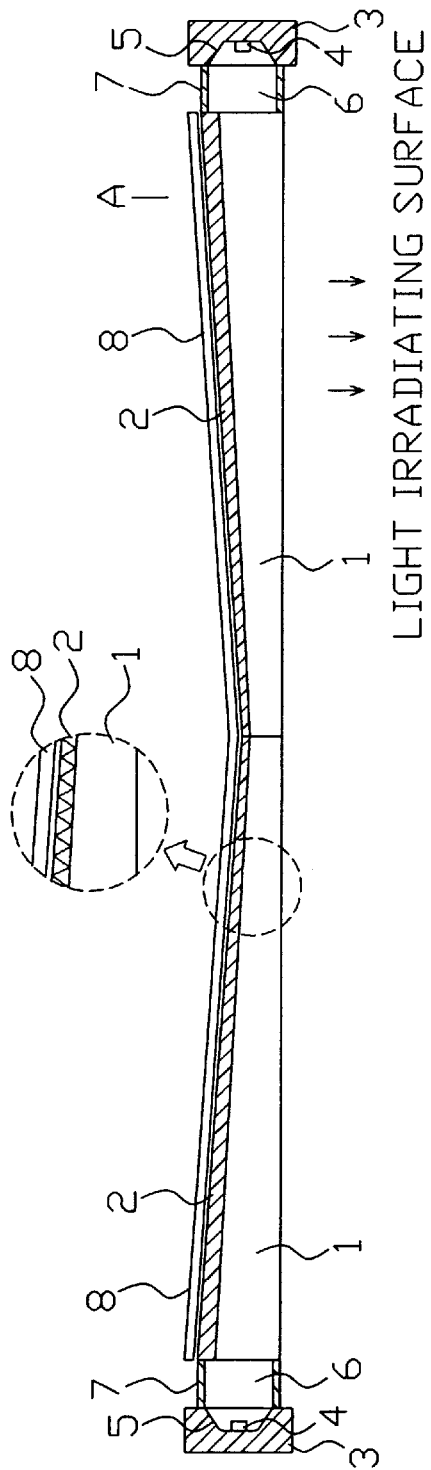
FIGS. 1(a)–1(b) are a side sectional view and a plan view of the linear beam irradiator according to the first embodiment of the present invention.
Figure 1B:
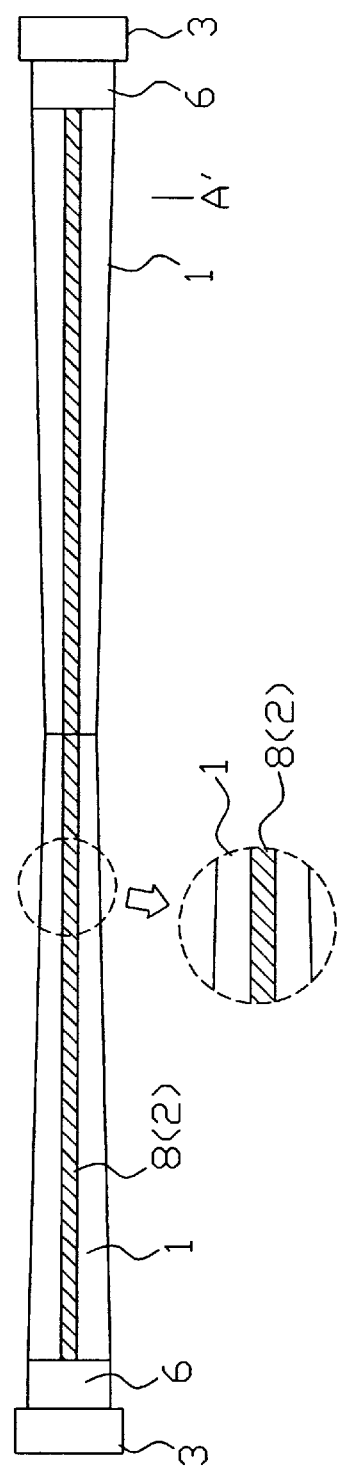
Figure 2:
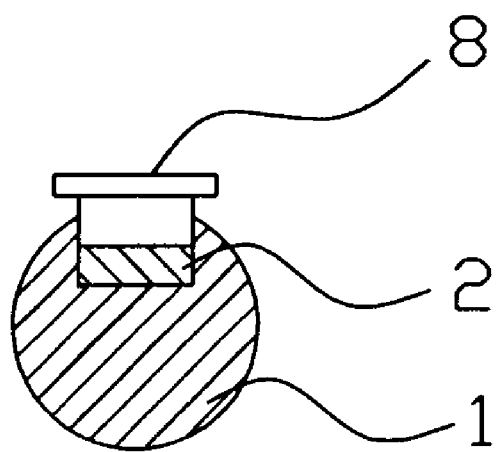
FIG. 2 is a A–A' sectional view of the linear beam irradiator according to the first embodiment of the present invention.
Figure 3:
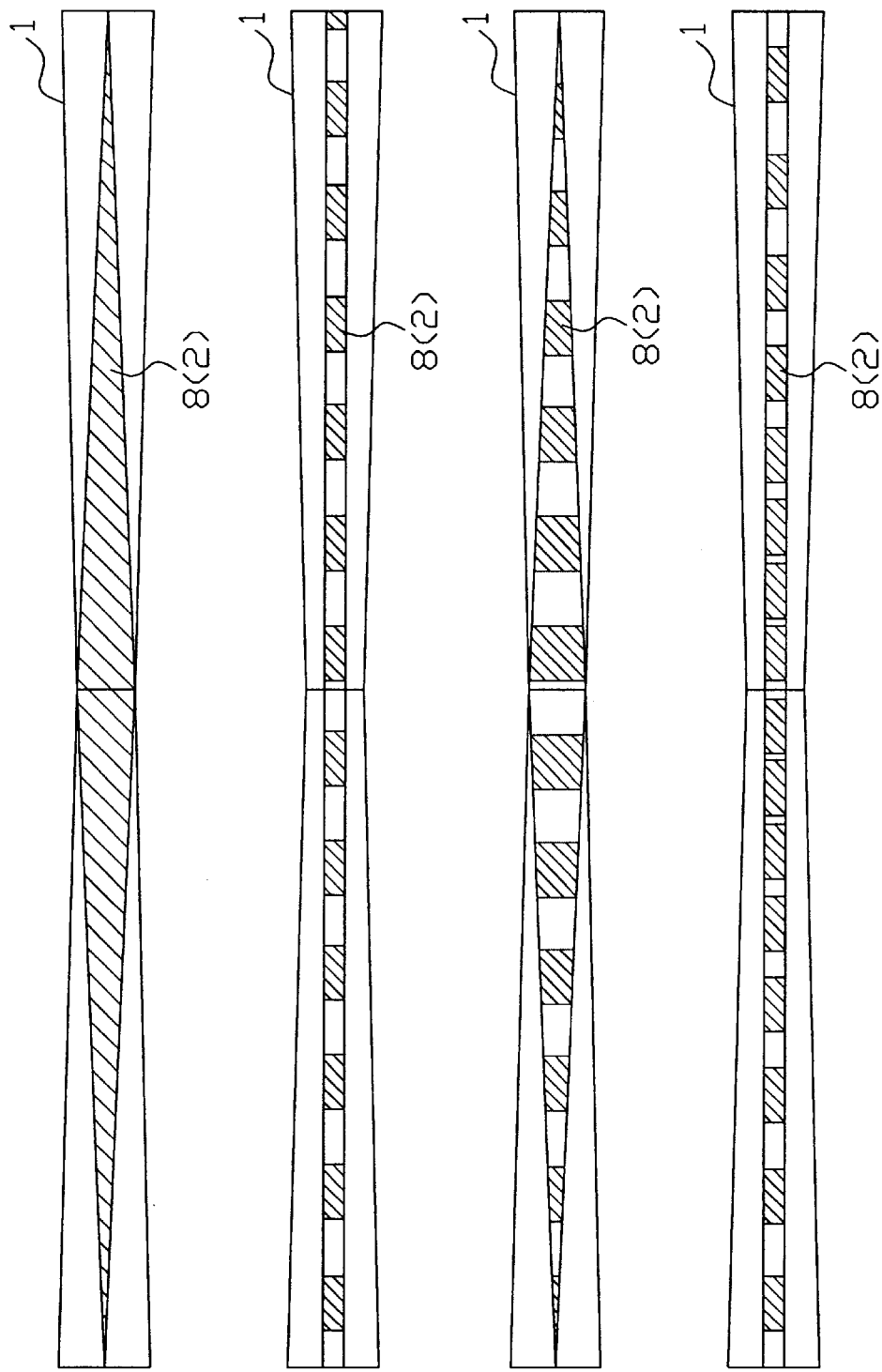
FIGS. 3(a)–3(d) are schematic diagrams of the light refraction & reflection area and/or the diffusing surface of the linear beam irradiator according to the first embodiment of the present invention.
Figure 4:
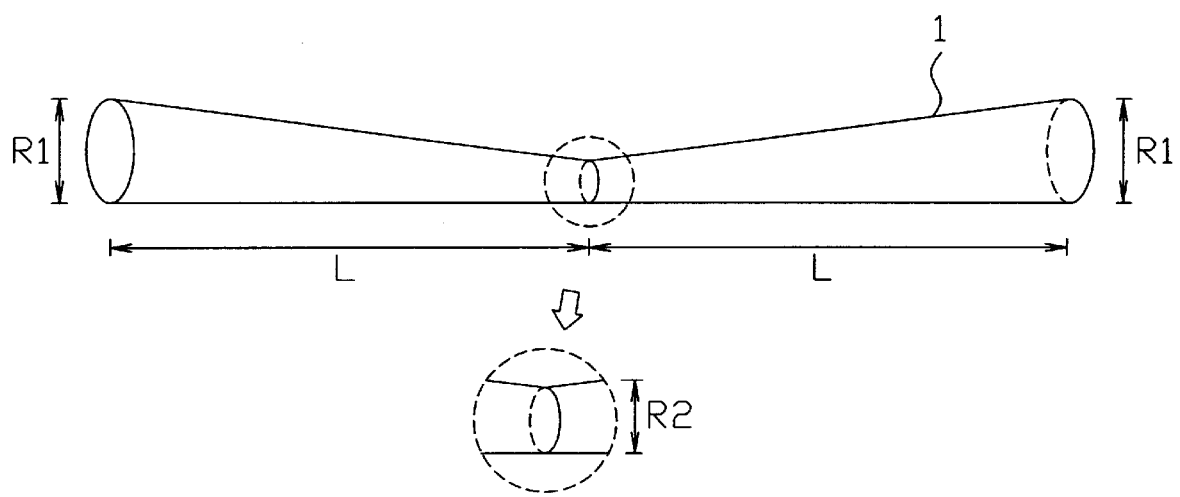
FIG. 4 is a drawing showing the light conductor portion of the linear beam irradiator according to the first embodiment of the present invention.
Figure 5:
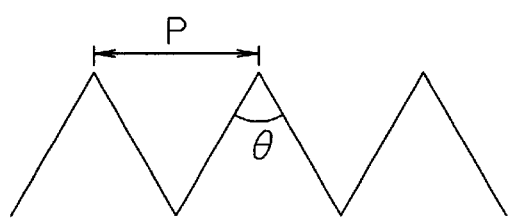
FIG. 5 is an expanded view of the light refraction & reflection area of the linear beam irradiator according to the first embodiment of the present invention.
Figure 6:
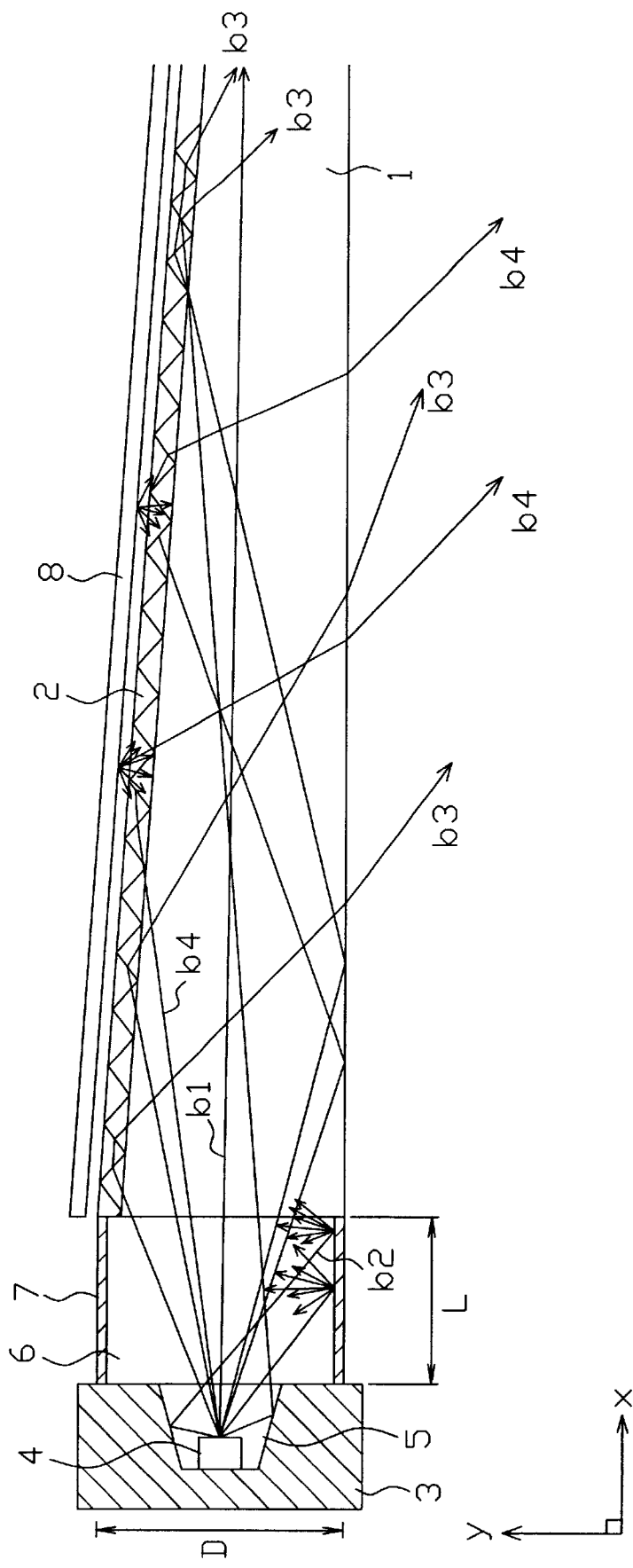
FIG. 6 is an expanded view of the light source portion of the linear beam irradiator according to the first embodiment of the present invention.

FIG. 1(a) is a side sectional view of the linear beam irradiator according to the first embodiment of the present invention, and FIG. 1(b) is a plan view of the linear beam irradiator according to the first embodiment of the present invention. FIG. 2 is a A–A' sectional view of the linear beam irradiator according to the first embodiment of the present invention. FIG. 3 is a schematic diagram of the light refraction & reflection area and/or the diffusing surface of the linear beam irradiator according to the first embodiment of the present invention, while FIG. 4 is a drawing showing an expanded view of only the light conductor portion of the linear beam irradiator according to the first embodiment of the present invention. FIG. 5 is an expanded view of the light refraction & reflection area of the linear beam irradiator according to the first embodiment of the present invention, and FIG. 6 is an expanded view of the light source portion of the linear beam irradiator according to the first embodiment of the present invention. Moreover, FIG. 7 and FIG. 8 are sectional views of the light conductor portion of the linear beam irradiator according to the first embodiment of the present invention.

Figure 7:
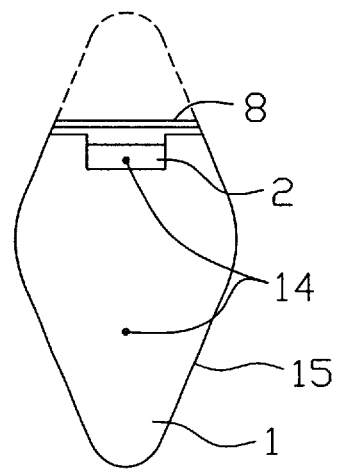
FIG. 7 is a A–A' sectional view of the linear beam irradiator according to the first and second embodiments of the present invention.
Figure 8:
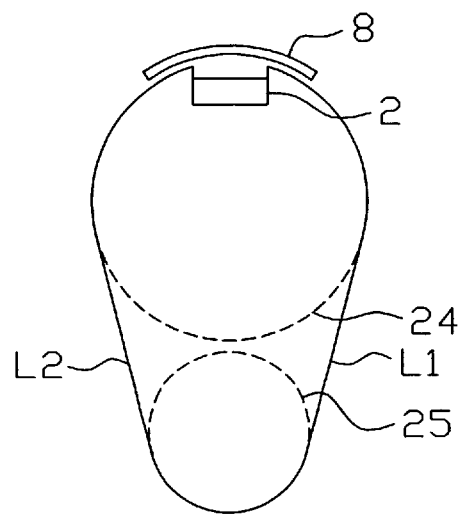
FIG. 8 is a A–A' sectional view of the linear beam irradiator according to the first and second embodiments of the present invention.

The sectional shape of the light conductor used for the present invention may be circular, elliptical, etc. or a shape formed by combining 2 circles as shown in FIGS. 7, 8, but the explanation here will be given by taking the case of a circular shape indicated FIG. 3 as an example.

The light conductor 1, made of a transparent material, is constructed in such a way as shown in FIGS. 1(a), (b), that the diameter of the sectional circle diminishes from both end faces toward the center, while a light refraction & reflection area 2 composed of a large number of interfaces of the chopping wave is provided on one side face in the longitudinal direction of the light conductor 1. At both ends of said light conductor 1 is disposed a circuit board 3 in the shape of a concave plane constituting the light source portion through a connecting part 6 to be described later, and a light emitting diode (LED) element 4 is disposed at the center of the circuit board 3. Moreover, across a space (air layer, for example) not optically matching with said light refraction & reflection area 2, a diffusing surface 8 made of white resin sheet with high diffusing effeciciency aluminium sheet with high reflecting effeciency is provided in a way to cover said light refraction & reflection area 2. Furthermore, at the outer circumference on both end faces of the light conductor 1 are provided a connecting part 6 having a diffusing layer 7 on its face. The sectional shape of the connecting part 6 has a diameter equal to or smaller than that of the light conductor 1.

Said light conductor 1 is shaped in such a way that, to maintain the illuminance uniformity at respective parts on the original surface being irradiating by the beam, the sectional area diminishes from both ends toward the central part, and becomes smallest at the center. Namely, since the quantity of light transmitting through the light conductor 1 decreases as the distance from the light source at both ends as described later increases, the intensity of irradiation on the original surface becomes uniform at respective parts if the diameter of the light conductor is also reduced in proportion to the quantity of light. In such construction, if a light enters the end face of the light conductor 1 from the light emitting diode 4 at both ends of the light conductor 1, this light is transmitted toward the center while repeating total reflection in the light conductor 1 as explained in details later, and goes out from the outgoing surface on a straight line opposing said light refraction & reflection area 2.

The diffusing layer 7 formed on the outer circumference of said connecting part 6 may be realized by coating a mixture of transparent silicon resin and $TiO_2$, for example, or may be constructed by inserting a cap made of white resin. Moreover, it is desirable to form said light conductor 1, a large number of chopping wave surfaces constituting the light refraction & reflection area 2, and the connecting part 6 integrally by injection molding by using transparent resin.

Said circuit board 3 is produced by forming an insulating layer of 100 $\mu$m or so on an Al printed circuit board of prescribed thickness, pasting copper foil (35~70 $\mu$m thick) on the entire surface of that insulating layer, and forming a circuit by etching. Only on this circuit, a galvanising layer is formed by Au (or Ag) by approximately 0.3 $\mu$m, and then a concave reflecting surface 5 is formed by stamping process using convex dies.

Said concave reflecting surface 5 can take the form of inverted truncated cone to reflect the light from the light conductor 1. And this makes it possible to emit the light from the light emitting diode (LED) element 4 disposed at the central part of the circuit board 3 in the forward direction (namely, to the direction of end face of the light conductor 1) and at the required angle distribution. Next, the light emitting diode (LED) element 4 is mounted on the bottom face of the inverted truncated cone at the concave reflecting surface 5 on the circuit board 3, by using a die mounter.

As light emitting diode (LED) element 4, an element of GaP is used for reading monochrome images, but a bare chip of green color such as quaternary AlGaInP, etc. is used in the case where high brightness is required. A light source switching type linear beam irradiator for reading color images can also be realized, by mounting one each of genuine red LED (GaAlAs, for example) element, genuine green LED (GaN, for example) element, and genuine blue LED (GaN, for example) element on a linear beam irradiator and lighting them one after another as red, green, blue.

The section of said light conductor 1 is of a circular shape as shown in FIG. 2, and its diameter at its end face is about 5 mm for example. To converge the light on the outgoing surface on the straight line opposing said light refraction & reflection area 2, a part of said section is partially cut in the shape of a concave groove in the longitudinal direction, and said light refraction & reflection area 2 is provided on the cut part. Moreover, as mentioned earlier, a diffusing surface 8 is disposed on the refraction & reflection area 2, across a space not optically matching with the light refraction & reflection area 2. The diameter of said connecting part 6, set about equal to or slightly smaller than the diameter of the light conductor 1 or in the range of 2 to 5 mm for example, is actually set at about 3.2 mm.

Said refraction & reflection area 2 is formed basically at one same width in the longitudinal direction of the light conductor 1 as shown in FIG. 1(*b*). However, considering that the quantity of light transmitting through the light conductor 1 diminishes toward the central part, said refraction & reflection area 2 may also be constructed in a way to increase in width from both ends toward the central part to maintain the uniformity of the intensity of irradiation, as shown in FIG. 3(*a*). It may also be all right to maintain the uniformity of the intensity of irradiation by disposing the refraction & reflection area 2 of a fixed width intermittently at prescribed length in the longitudinal direction, as shown in FIG. 3(*b*), or reduce the length of said intervals toward the central part, as shown in FIG. 3(*d*). Moreover, the refraction & reflection area 2 may be disposed intermittently in the longitudinal direction in a way to gradually increase in width from both end faces of the light conductor toward the central part, as shown in FIG. 3(*c*).

Since the refraction & reflection area 2 is covered by the diffusing surface 8 as mentioned earlier, said diffusing surface 8 shall preferably have the same shape as said refraction & reflection area 2, but may also be constructed in a way to cover the light conductor 1 other than the light irradiating surface.

As described above, while the connecting part 6 and the refraction & reflection area 2 are injection molded with the same transparent resin material as that of the light conductor 1, the transmission efficiency of light improves if the index of refraction of the material at that time is set for approximately 1.5, for example. Moreover, as this transparent resin, it is desirable to use an epoxy based or modified acrylate based UV hardened resin such as heat-resistant acrylic resin, polycarbonate, amorphous polyolefin, etc., considering light transmissivity, heat resistance, and fluidity of resin at the time of injection molding, for example.

Furthermore, as shown in FIG. 4, in the case where the range of the length L of the light conductor 1 is set for 50 mm~300 mm and the ranges of the diameter R1 of the entry side light conductor and the diameter R2 of the light conductor at the tip are set for 0.3<R2/R1<0 , it is possible to irradiate linear beam light with uniform intensity from the light irradiating surface in the main scanning direction. In the present embodiment, especially the light conductor 1 can be formed with a length L of 115 mm for example, a diameter R1 at both ends of 5 mm for example, a diameter R2 at the central part of 2.7 mm or so for example, thus making it possible to totally reflect the light transmitting through the inside of the light conductor 1 and to thereby obtain a linear beam of uniform intensity of light.

As shown in FIG. 5, the shape of the chopping wave surface may be selected as desired if only the tip angle $\theta$ of the chopping wave surface is kept in the range of 60~120 and the pitch P of the chopping wave surface is maintained within the range of 30 $\mu$m~500 $\mu$m. In the present invention, it has a pitch of 300 $\mu$m for example and a tip angle of 90 for example.

In said construction, as shown in FIG. 6, part of the light emitted from the light source directly gets into the light conductor 1, while other part once enters said concave reflecting surface 5 and is reflected, and then gets into the light conductor 1.

In this way, of the light which entered the light conductor 1, only the light component b1 in the longitudinal direction X gets in the connecting part 6 and then passes straight into the light conductor 1. On the contrary, of the light components having a component in the direction y perpendicular to said longitudinal direction X, the light which directly entered the light conductor 1 through the connecting part 6 (b3, for example), is totally reflected on the inner side face of the light conductor 1, to eventually reach the refraction & reflection area 2. And, this light component b3 is abruptly bent downward by being refracted at the interface of the chopping wave of the refraction & reflection area 2, and is irradiated downward from the light irradiating surface (other side face) through the inside of the light conductor 1 to irradiate the surface of the original. Moreover, the light component b4, which passes to above the refraction & reflection area 2 enters the diffusing surface 8 through a space not optically matching with this refraction & reflection area 2, is diffused at the diffusing surface 8, and enters the light conductor 1 again through the refraction & reflection area 2, and is eventually irradiated downward from the light irradiating surface of the light conductor 1 to irradiate the surface of the original 51.

In the above construction, the respective dimensions are decided in such a way that they satisfy the conditional expression (1) given as:

$$L > (D/2)\tan(\sin^{-1}(1/nLG)) \qquad (1)$$

in the case where the diameter of the connecting part 6 is given as D, the length as L, and the index of refraction at the connecting part 6 and the light conductor 1 as nLG so that the light which directly entered the light conductor 1 may be totally reflected on the inner side face of the light conductor 1.

It is so arranged that, of the light which entered the connecting part 6, the light component b2 reaching the inner side face of the connecting part 6 is once diffused by the diffusing layer 7, and it gets into the light conductor 1. If this diffusing layer 7 did not exist, the light would be irradiated directly to outside from the side face, and the illuminance on the surface of the original existing just under the connecting part 6 would sharply increase partially, increasing deviation of illuminance. Moreover, the diffusing layer 7 provided on the outer circumference of the connecting part 6 may also be a reflecting layer which can provide the same effect as that of a diffusing layer. Furthermore, a light shielding layer for shielding light may be provided from outside instead of the diffusing layer. In that case, however, said light component b2 is absorbed by the light shielding layer and, as a result, there would be less deviation of illuminance but the irradiation efficiency would become lower, compared with a case where a diffusing layer and a reflecting layer are provided.

As described above, the light component b2 which entered the light conductor 1 from the diffusing layer 7 of the connecting part 6 transmities in the light conductor 1 in the same way as b3 and b4, and is irradiated as light beam.

The characteristics of a linear beam irradiator for A4 size, which forms a linear light beam based on the above-described mechanism may be evaluated as follows:

In the case where the number of LED elements (GaP, λ=565 nm) is 4, we realized 4001× as illuminance on the surface of original, and approximately 10% as deviation of illuminance on the surface of the original (measured with a clearance of 1.1 mm between the light irradiating surface of the linear beam irradiator and the surface of the original). Compared with a conventional linear beam irradiator, the number of LED elements could be reduced to approximately ⅛. Moreover, while a distance of approximately 8 to 10 mm was required as distance between the light irradiating surface of the linear beam irradiator 52 and the surface of the original 51 with a conventional linear beam irradiator, the deviation of illuminance could be controlled within the tolerance (10%) even when the linear beam irradiator 52 was brought closer within a distance no more than 1.5 mm with the embodiment of the present invention. This made it possible to realize a cost reduction of 60% and reduce the size of the equipment itself by about one half.

The space formed between said refraction & reflection area 2 and the diffusing surface 8 helps the total reflection on the refraction & reflection area 2 by being formed with a material having an index of refraction smaller than that of the light conductor 1 (air layer, for example), and can thus remarkably increase the effect compared with a case where the diffusing surface 8 is formed directly on the refraction & reflection area 2.

As described above, the linear beam irradiator according to the first embodiment has a high irradiation efficiency and little deviation of illuminance, and can therefore realize a low-cost, high-quality, compact and lightweight optical image reader capable of reading images at a high resolution.

(Modified embodiment 1)

Next, the shape of the section at section A–A' of the light conductor 1 may be made elliptical, as shown in FIG. 7. The ellipsis 15 was constructed with a major axis of 6 mm for example and a minor axis of 3 mm for example. In this case, part of the light conductor 1 is removed along the cutting line perpendicular to the major axis of the ellipsis 15 and passing through one of the 2 focal points, so as to dispose the refraction & reflection area 2 on the plane formed by this cutting line. The diameter of the connecting part 6 is formed in a size equal to or slightly smaller than the minor axis of the light conductor 1 in the range of 2 to 3 mm for example, and is constructed in a way to lead the light from the light source to the light conductor 1.

With said construction, the light refracted and reflected at the refraction & reflection area 2 is reduced on the inner side face of the light conductor 1, and this makes the illuminance of the light irradiated on the surface of the original 1.5 times higher compared with a case in which the shape of the section is circular. Especially in the case where the refraction & reflection area 2 is disposed at the position of one of the 2 focal points of the ellipsis, after the light emitted from this one focal point converges at the other focal point of the ellipsis once or converges directly at a focal point formed outside the ellipsis, thus further improving the transmission efficiency.

By taking an elliptical shape for the section of the light conductor 1 as above, it becomes possible to obtain a high irradiation efficiency and reduce the deviation of illuminance, and to thus provide a low-cost, high-quality, compact and lightweight optical image reader capable of reading images at a high resolution. In addition, since the width of the light beam irradiated on the surface of the original is reduced, the illuminance of the irradiated light can be more intensified, compared with a case of a circular section.

(Modified embodiment 2)

Moreover, as shown in FIG. 8, the shape of the section cut at the plane A–A' of the light conductor 1 may be selected as a shape constructed with 2 circles 24, 25 different in diameter and straight lines tangential to those 2 circles. Namely, said light conductor 1 consists of first circle 24 for transmitting the light from the light source and second circle 25 provided with the function of a lens through which the light is irradiated on the surface of the original. Furthermore, the refraction & reflection area 2 is formed on one side face in the longitudinal direction in said first circle 24, while the diffusing surface 8 is provided in a way to cover the refraction & reflection area 2 and part of the second circle 25. While the dimensions of diameter of the first circle 24 and the second circle 25 are maximum 5 mm and 3 mm, respectively here for example, they are not necessarily restricted to those values.

At this time, the sectional area of the first circle 24 and the second circle 25 can be reduced gradually toward the center, in the same way as in said respective examples, but it is more desirable to reduce the sectional area of the first circle 24 only toward the center, due to the fact that the quantity of light transmitting through the light conductor 1 diminishes as it comes closer to the center. On the other hand, the second circle 25 is formed in a way to have one same diametert in any section in the longitudinal direction of the light conductor 1. Moreover, the end part of said first circle 24 and the light source are connected to each other through the connecting part 6 in this construction, and the diameter of the connecting part 6 is set for 5 mm, equal to the diameter of the first circle 24, or a value slightly smaller than that, for example.

With the adoption of a construction as described above, the light refracted or reflected in the light refraction & reflection area 2 is totally reflected on the side face of the light conductor 1 and converges on the extension of a straight line connecting the center of the 2 circles 24, 25 outside the second circle 25. This reduces the width of the irradiated light and makes the illuminance of the light irradiated on the surface of the original 1.5 times higher compared with a case in which the shape of the section of the light conductor 1 is circular.

As described above, by constructing the outline in such a way that the diameter of the first circle 24 on the refraction & reflection side becomes larger than the diameter of the second circle 25 on the light emission side and that both the first circle 24 and the second circle 25 are combined by the two tangent lines L1, L2, it becomes possible to improve the transmission efficiency of light to a maximum, with little leakage of light from points other than the light irradiating surface. Moreover, by changing the diameter of the second circle 25, it is possible to freely vary the beam width or focal distance of the light to be irradiated on the surface of the original.

Evaluation of the characteristics of the above linear beam irradiator are as follows: For A-4 size paper that requires four LED elements, illuminance of the light irradiated on the surface of the original is 1000lx, and deviation of illuminance (measured with a clearance of 1.1 mm between the light irradiating surface and the surface of the original) stands at 10%. Compared with a conventional linear beam irradiator, the number of LED elements was reduced to approximately one eighth, while the distance from the irradiator to the surface of the original, which used to be approximately 8 to 10 mm as minimum requirement, can be reduced to no more than 1.5 mm while controlling the deviation of illuminance within the tolerance (10%). This reduces the cost by 75% and the size of the equipment itself by around 50%. In addition, in the case of colored image brought about by using two LED elements of red, blue and green, an illuminance on the surface of the original is 2000lx, and a deviation of illuminance is 10% or under for all of the color elements.

As described above, with a shape of section of the light conductor 1 constructed with 2 circles different in diameter and straight lines tangential to the 2 circles, the irradiation efficiency on the surface of the original improves and the deviation of illuminance decreases, making it possible to provide a low-cost, high-quality, compact and lightweight optical image reader capable of reading images at a high resolution. Moreover, since the width of the light beam irradiated on the surface of the original is reduced, the illuminance of the irradiated light can be more intensified, compared with a case of a circular section. In addition, it also becomes possible to freely change the width and the focal distance of light beam.

(Embodiment 2)

The second embodiment of the present invention will be explained hereafter with reference to drawings.

Figure 10:
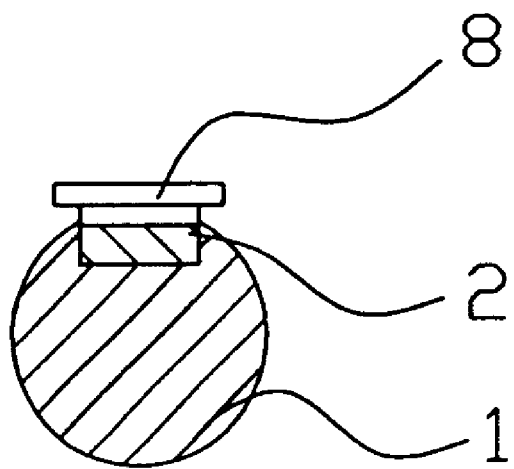
FIG. 10 is a B–B' sectional view of the linear beam irradiator according to the second embodiment of the present invention.
Figure 11A:
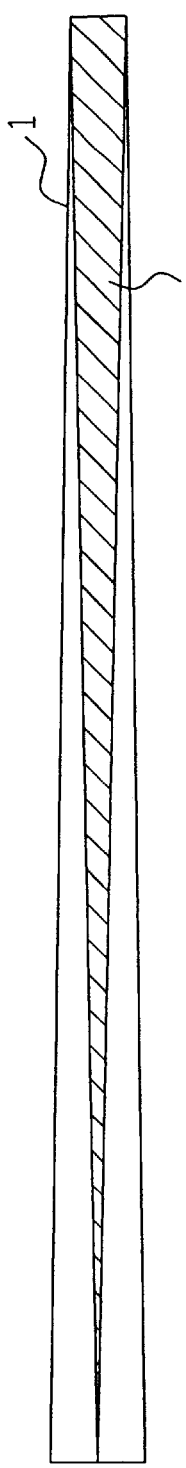
FIGS. 11(a)–11(d) are schematic diagrams of the light refraction & reflection area and/or the diffusing surface of the linear beam irradiator according to the second embodiment of the present invention.
Figure 11B:
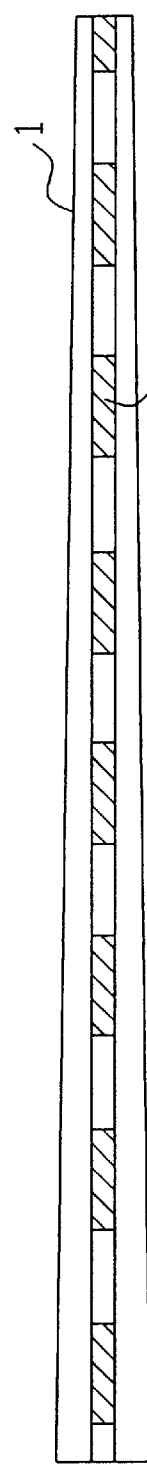
Figure 11C:
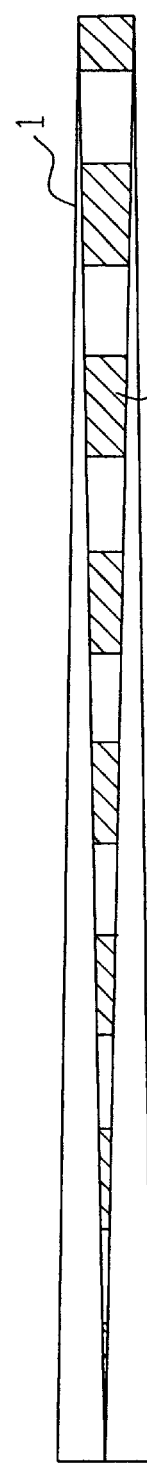
Figure 11D:
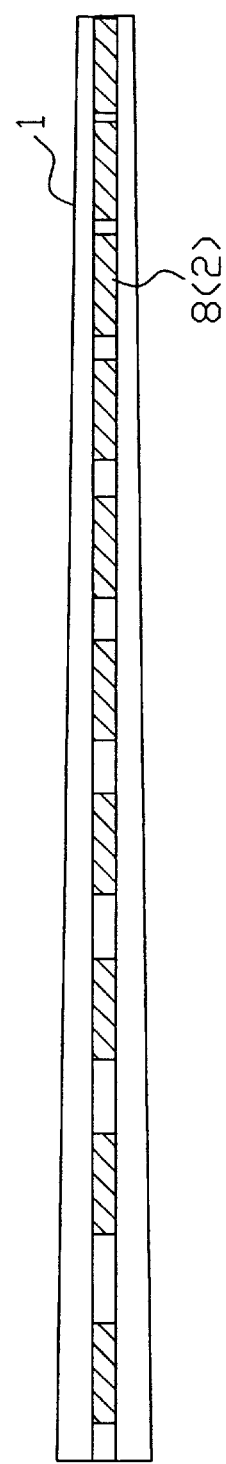
Figure 12:
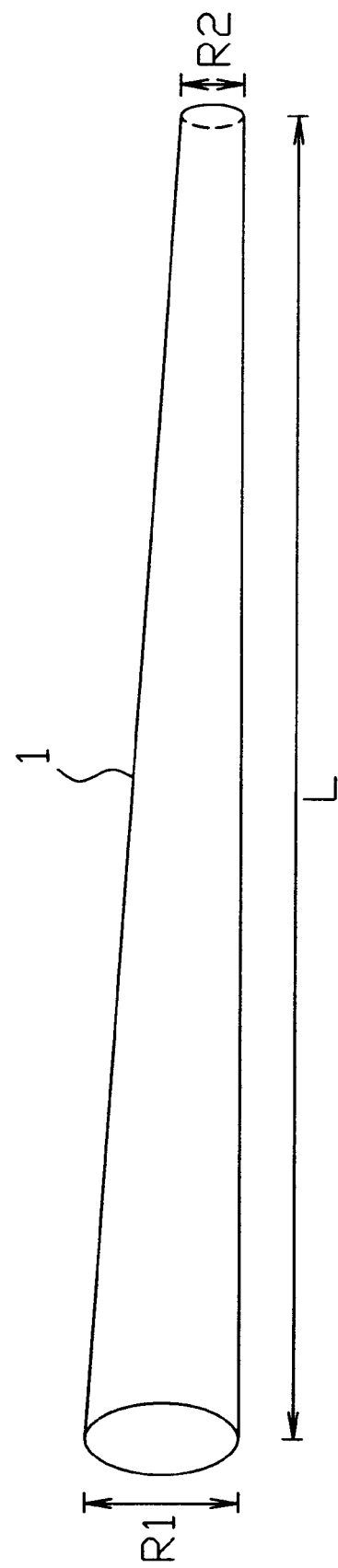
FIG. 12 is a drawing showing the light conductor portion of the linear beam irradiator according to the second embodiment of the present invention.
Figure 13:
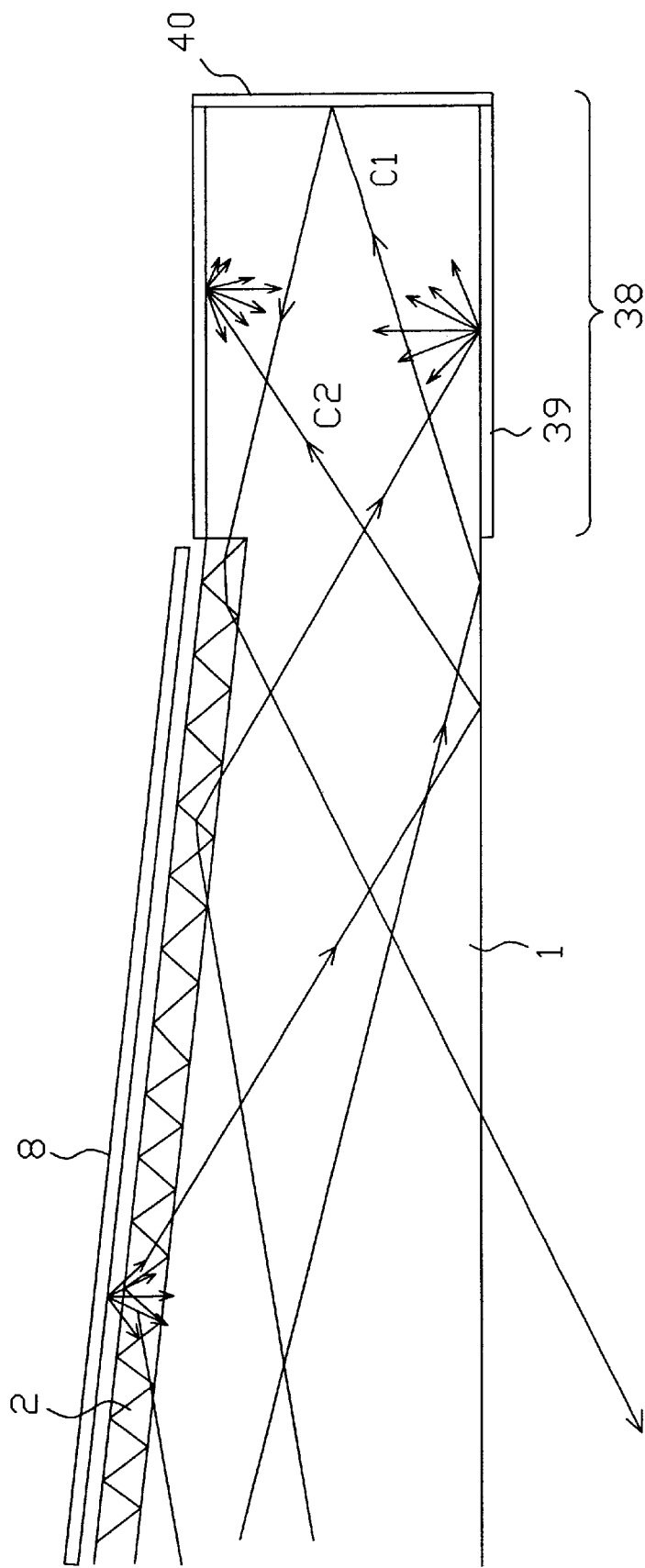
FIG. 13 is an expanded view of the light terminal area of the linear beam irradiator according to the second embodiment of the present invention.
Figure 14:
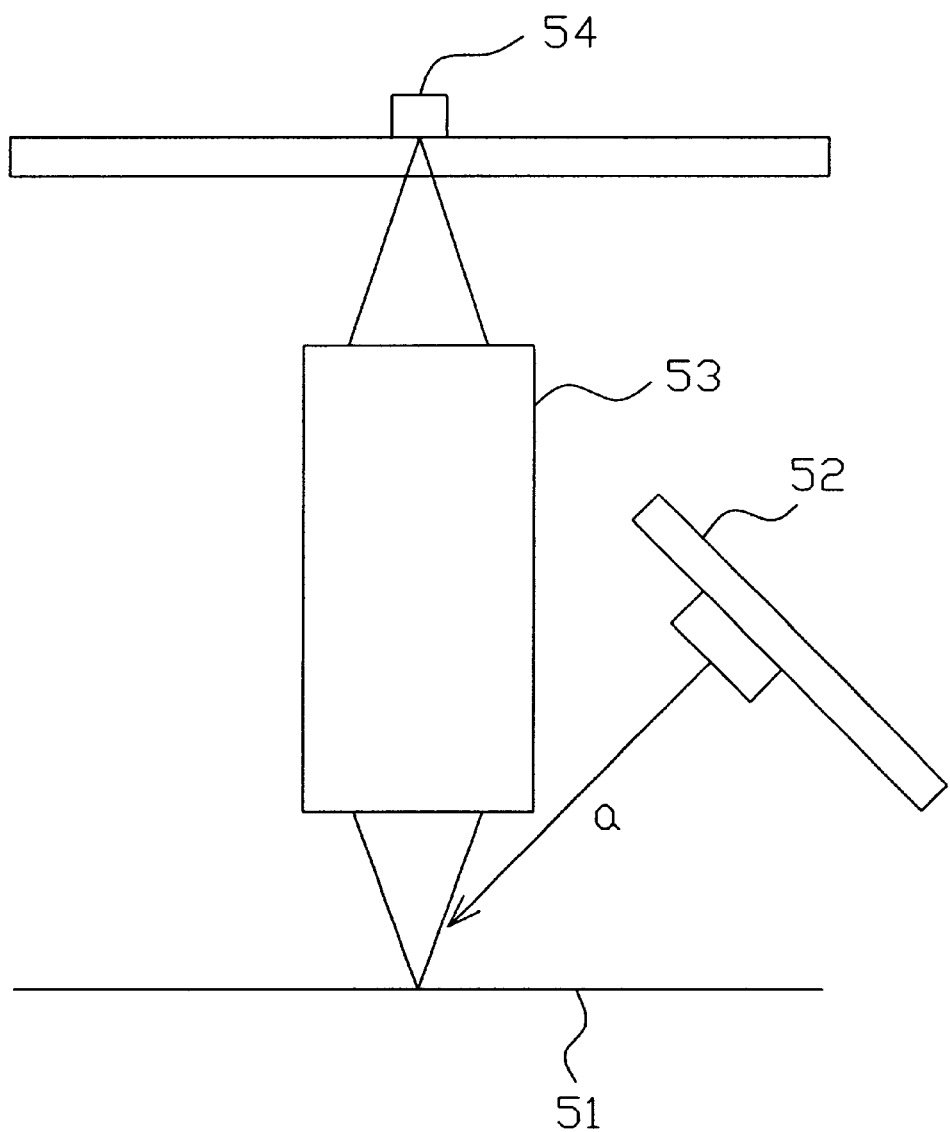
FIG. 14 is a construction drawing of a conventional optical image reader.
Figure 15:
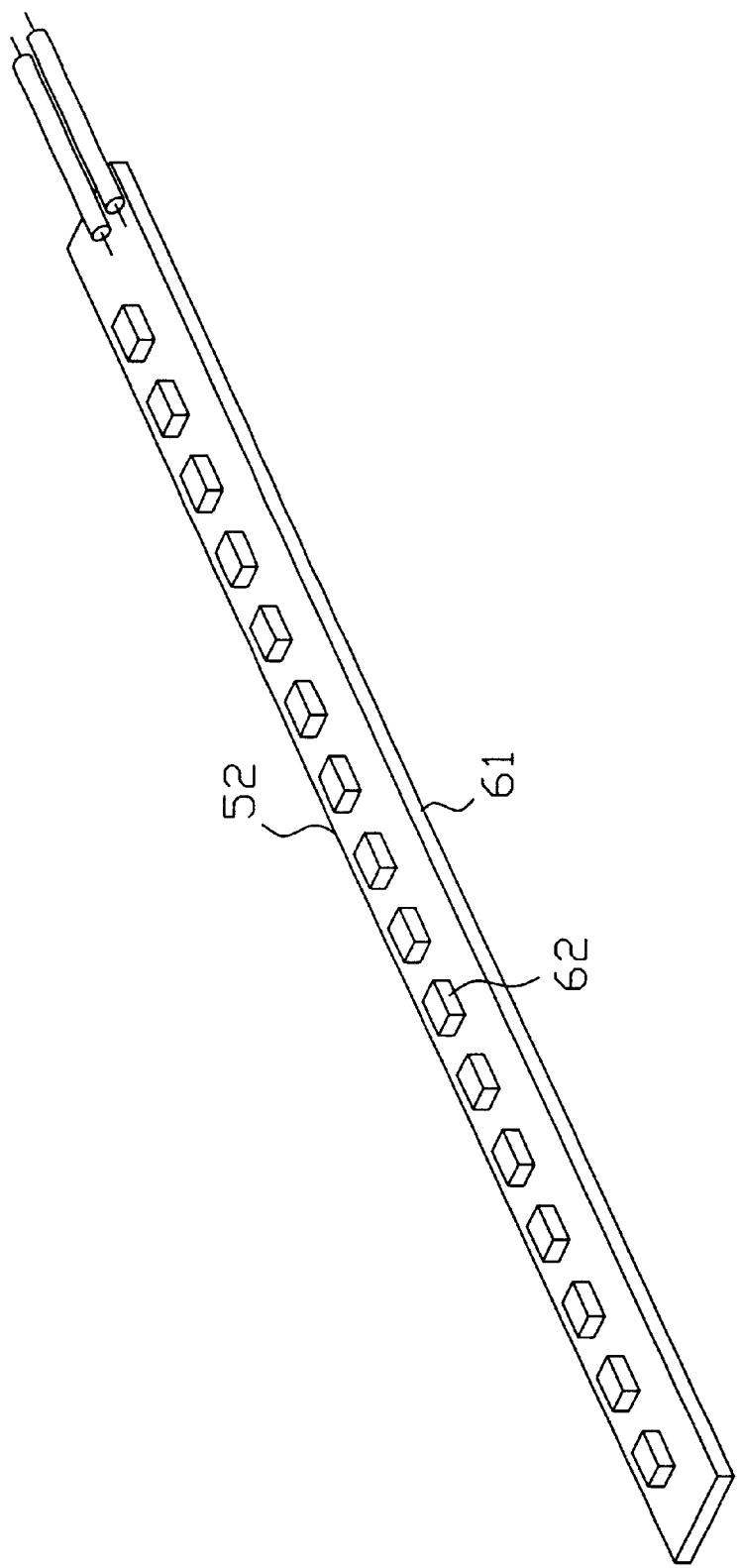
FIG. 15 is a construction drawing of only the LED array portion of a conventional optical image reader.

FIG. 9(*a*) is a side sectional view of the linear beam irradiator according to the second embodiment of the present invention, FIG. 9(*b*) is a plan view of the linear beam irradiator according to the second embodiment of the present invention. FIG. 10 is a B–B' sectional view of the linear beam irradiator according to the second embodiment of the present invention, while FIG. 11 is a schematic diagram of the light refraction & reflection area and/or the diffusing surface of the linear beam irradiator according to the second embodiment of the present invention. FIG. 12 is a drawing showing an expanded view of only the light conductor portion of the linear beam irradiator according to the second embodiment of the present invention. FIG. 13 is an expanded view of the light terminal area of the linear beam irradiator according to the second embodiment of the present invention.

As shown in FIG. 9, the light source is disposed at an end of the light conductor 1, and the other end forms a light terminal area. In this embodiment, explanation will be given in detail hereafter mainly on the construction different from that of the first embodiment.

The light conductor 1 diminishes in sectional area from one end to the other, and becomes smallest at the other end. Moreover, a light terminal area 38 is formed at the other end of the light conductor 1. And a light diffusing layer 39 is provided at the outer circumference, and a light reflecting layer 40 on the end face of the light terminal area 38. Furthermore, since the quantity of light tranmitted through the light conductor 1 gradually diminishes as travelling from the light source toward the other end, the uniformity of the intensity of irradiation on the surface of the original can be secured even with a construction comprising a light diffusing layer 39 and a light reflecting layer 40 in place of the light source used in said first embodiment. Explanation on other parts will be omitted because their construction is the same as that of the first embodiment. Explanation here will be given by putting the same number to one same portion.

Said light terminal area 38, which is made of the same transparent resin as that of the light conductor 1, shall preferably be injection molded integrally with the light conductor 1, the connecting part 6 and the refraction & reflection area 2 constituted by a large number of chopping wave surfaces. Moreover, the light diffusing layer 39 provided at the outer circumference of the light terminal area 38 is formed by coating a mixture of transparent silicon resin and $TiO_2$ in the same was as the diffusing layer 7. This light diffusing layer 39 may also be prepared by inserting a cap of white resin. Furthermore, the light reflecting layer 40 provided at the end face of the light terminal area 38 is formed either by deposition or dipping of Al or by pasting Al foil to the light terminal area 38 by means of a transparent bonding agent.

Next, as shown in FIG. 10, the shape of the section of the light conductor 1 is such that, in the same way as in the first embodiment, a part of the light conductor 1 is cut in the shape of a concave groove in the longitudinal direction, and said light refraction & reflection area 2 is provided on the cut part, and that a diffusing surface 8 is provided on the refraction & reflection area 2, across a space not optically matching with the light refraction & reflection area 2.

Said light refraction & reflection area 2 is formed, in the same way as in the first embodiment, basically with one same width in the longitudinal direction as shown in FIG. 9(*b*). However, due to the quantity of light being transmitted through the light conductor 1 diminishes toward the central part, said refraction & reflection area 2 may also be constructed in a way to increase in width from one end toward the other to maintain the uniformity of the intensity of irradiation, as shown in FIG. 11(*a*). The refraction & reflection area 2 can be disposed intermittently in this state, as shown in FIG. 11(*c*), or a construction of disposing the refraction & reflection areas 2 of one same width in longitudinal direction and of fixed length at regular intervals in the longitudinal direction can be adopted, as shown in FIG. 11(*b*). Moreover, as shown in FIG. 11(*d*), the refraction & reflection area 2 may be disposed in a way to gradually decrease in said interval from one end toward the other.

Since the refraction & reflection area 2 is covered by the diffusing surface 8, said diffusing surface 8 shall preferably have the same shape as said refraction & reflection area 2 or a shape larger than that, in the same way as in the first embodiment, in a way to cover the light conductor 1 other than the light irradiating surface.

In this embodiment, as shown in FIG. 12, the light conductor 1 has such dimensions as the diameter R1 at one end of 5 mm for example, the diameter R2 at the other end of 2 mm for example, and a length L of 230 mm or so for example, and linear beam of high efficiency could be irradiated with such dimensions.

In the same way as in the first embodiment, a linear beam irradiator of a color image reader can also be realized by using red, green and blue elements for the LED elements and mounting one each of such elements.

The operation of a linear beam irradiator constructed as above will be explained hereafter. Since the transmission paths of the light irradiated on the way, of the light components emitted from the light source 5, are as already explained earlier, the explanation here will be given only for the outgoing paths of the light reached the light terminal area 38.

As shown in FIG. 13, of the light discharged from the light emitting diode (LED) element 4, the light component C1, reflected, refracted and diffused at the light conductor 1, the refraction & reflection area 2 and the diffusing surface 8, is reflected by the light reflecting layer 40 as it gets into the light terminal area 38 from the light conductor 1. As the light thus reflected by the light reflecting layer 40 gets into the light conductor 1 again, it is abruptly bent at the refraction & reflection area 2 and transmits downward. After that, this light goes out from the side face at the bottom of the light conductor 1, to irradiate the surface of the original.

Moreover, in the case where the light component C2, which entered the light terminal area 38 from the light conductor 1, directly reached the light diffusing surface 39 without reaching the light reflecting surface 40, this light component C2 is diffused by the light diffusing surface 39 to either enter the light conductor 1 again, or enter the light diffusing surface 39 on the opposite side to be diffused again there or reflected on the light reflecting surface 40, to eventually go out from the side face at the bottom of the light conductor 1 and irradiate the surface of the original.

Namely, of the light which entered the light conductor 1, the light components C1, C2 which reached the light terminal area 38 by repeating total reflection, either return to the light conductor 1 after being totally reflected again by the light reflecting surface 40 to be reutilized, or are diffused by the light diffusing surface 39 for reutilization, and are used to irradiate the surface of the original without loss.

In the same way as with the diffusing layer 7 provided at the outer circumference of the connecting part 6, the same effect as above can be obtained with the use of a light reflecting layer or a light shielding layer instead of the light diffusing layer 39. Although the light which reached the light terminal area 38 is ignored with the use of a light shielding layer, this disregard of the light which reached the light terminal area 38 does not have much influence on the entire efficiency. Moreover, the same effect as that described above can be obtained also with the use of a light reflecting layer or a light shielding layer instead of the light diffusing layer 40.

Evaluation of the characteristics of a linear beam irradiator for A4 size forming a linear beam based on a mechanism as described above is as follows: illuminance on the surface of the original is 370lx and deviation of illuminance is 10%, even in a case where the number of LED elements (GaP, λ565 nm) is set for 3, with a clearance of 1.1 mm between the light irradiating surface and the surface of the original. Compared with a conventional LED array, the number of LED elements can be reduced to approximately one tenth. Moreover, the distance from the linear beam irradiator 52 to the surface of the original 51, which used to be approximately 8 to 10 mm as minimum requirement with a conventional LED array, could be reduced to no more than 1.5 mm while controlling the deviation of illuminance within the tolerance (10%). This made it possible to realize a cost reduction of 65%, and reduce the size of the equipment itself by about one half with an image reader loaded with a linear beam irradiator according to this embodiment.

Also in this embodiment, it is possible to improve the reflection efficiency of the refraction & reflection area 2, by forming the space, formed between said refraction & reflection area 2 and the diffusing surface 8, with a material having an index of refraction smaller than that of the light conductor 1.

As described above, the linear beam irradiator according to the second embodiment has a high irradiation efficiency and little deviation of illuminance, and can therefore realize a low-cost, high-quality, compact and lightweight optical image reader capable of reading images at a high resolution.

(Modified embodiment 3)

Moreover, in the same way as in embodiment 1, the shape of the section at section B–B' of the light conductor 1 may be made elliptical, as shown in FIG. 7. In this case, the irradiated light converges on the extension of the major axis of the ellipsis, and this reduces the width of the light irradiated on the surface of the original and makes the illuminance of the light irradiated on the surface of the original 1.5 times higher compared with a case in which the shape of the section is circular.

Furthermore, in the case where the refraction & reflection area 2 is disposed at the position of one of the 2 focal points of the ellipsis, the best convergence rate of the light is obtained with improved transmission efficiency.

While, in the above explanation, the diffusing surface 8 without optical matching was formed across a space against the refraction & reflection area 2, the same effect can be obtained also when it is formed directly on the refraction & reflection area 2, in the same way as in the first embodiment.

As described above, the linear beam irradiator according to the second embodiment has a high irradiation efficiency and little deviation of illuminance, and can therefore realize a low-cost, high-quality, compact and lightweight optical image reader capable of reading images at a high resolution. In addition, since the width of the light beam irradiated on the surface of the original is reduced, the illuminance of the irradiated light can be more intensified, compared with a case of a circular section.

(Modified embodiment 4)

Moreover, as shown in FIG. 8, the shape of the section of the light conductor 1 may be constructed with 2 circles different in diameter and tangential lines to those 2 circles. The optimal conditions for total reflection of the light irradiated from the light source are to make the diameter of the first circle 24 larger than that of the second circle 25 from which the light is irradiated. And to construct the shape of section of the light conductor 1 with the first circle 24, the second circle 25 and tangential lines L1, L2 of the first circle 24 and the second circle 25, which makes it possible to improve the transmission efficiency.

In this embodiment, the outline is constructed in such a way that the sectional area of the light conductor 1 diminishes from one end toward the other in the first circle 24, while in the second circle 25 one same sectional area is maintained in any part in the longitudinal direction. While the dimensions of diameter of the first circle 24 and the second circle 25 are given maximum 5 mm and 3 mm, respectively for example, in the same way as in the first embodiment, they are not necessarily restricted to those values. The connecting part 6 is formed with a diameter either equal to the diameter of the first circle 24 (5 mm, for example) or smaller than that (3 mm, for example), and is connected to the first circle 24.

With the adoption of a construction as described above, the light refracted or reflected in the light refraction & reflection area 2 is totally reflected in the light conductor 1 and converges on the extension of a straight line connecting the center of the 2 circles 24, 25 outside the second circle 25, and this reduces the width of the irradiated light and makes the illuminance of the light irradiated on the surface of the original 1.5 times higher, compared with the case where the shape of the section circular.

Moreover, by changing the diameter of the second circle 25, it becomes possible to freely vary the beam width or focal distance of the light to be irradiated on the surface of the original. As a result, it becomes possible to provide a linear beam irradiator with an optimal transmission efficiency.

Even in the case for A-4 size paper where the number of LED elements is set for 2 with a clearance of 1.1 mm between the light irradiating surface and the surface of the original, illuminance of the light irradiated on the surface of the original is 600lx and deviation of illuminance is 10%. Compared with a conventional linear beam irradiator, the number of LED elements was reduced to approximately 1/10, while the distance from the irradiator to the surface of the original, which used to be approximately 8 to 10 mm as minimum requirement, can be reduced to no more than 1.5 mm while controlling the deviation of illuminance within the tolerance (10%). This made it possible to realize a cost reduction of 80% and reduce the size of the equipment itself by about one half. In addition, in the case of coloured image brought about by one LED element for blue, green and red, an illuminance on the surface of the original of 1200lx, and a deviation of illuminance of 10% or under could be secured for all of the color elements.

As described above, the linear beam irradiator according to the second embodiment has a high irradiation efficiency and little deviation of illuminance, and can therefore realize a low-cost, high-quality, compact and lightweight optical image reader capable of reading images at a high resolution. In addition, since the width of the light beam irradiated on the surface of the original is reduced, the illuminance of the irradiated light can be more intensified, compared with a case of a circular section. It also becomes possible to freely change the beam width or focal distance of the light.

As explained above, since the present invention comprises, a light refraction & reflection area constructed with chopping wave surfaces, a diffusing surface which covers this light refraction & reflection area and diffuses the light, the light irradiated in this light refraction & reflection area goes out from the other side face in the longitudinal direction of the light conductor, thus improving the transmission efficiency. Especially, formation of a space not optically matching with said light conductor, between said light refraction & reflection area and said diffusing surface, further increases that effect.

Moreover, by disposing a light source at both ends of said light conductor and constructing the sectional area of this light conductor in a way to gradually diminish from the both end faces toward the central part, it becomes possible to secure a sectional area suitable to the quantity of light and further improve the efficiency of the light conductor. In the case where the light source is disposed at one end of said light conductor, the same effect as above can be obtained by reducing the sectional area of the light conductor gradually from one end toward the other of the light conductor.

While a variety of shapes are possible as the sectional shape of said light conductor, by adopting a construction made with an ellipsis or 2 circles different in diameter and tangential lines of the 2 circles, it becomes possible to realize a linear beam irradiator with high efficiency of irradiation on the surface of the original and little variation of illuminance. Moreover, a compact and lightweight linear beam irradiator can be realized, because the distance between the linear beam irradiator and the surface of the original can be shortened.

What is claimed is:

1. A linear beam irradiator comprising:

a light conductor extending in a longitudinal direction, said light conductor having two ends and two side faces, and said light conductor having light permeability;

a light refraction & reflection area having chopping wave surfaces, said light refraction & reflection area provided on a surface in the longitudinal direction of one side face of said light conductor;

a diffusing surface covering said light refraction & reflection area; and a light source at both ends of said light conductor, wherein light discharged from said light source is directed into said light conductor, wherein light refracted or reflected in said light refraction & reflection area is irradiated in the form of a linear beam to the outside of said light conductor, and wherein the entirety of the other side face, in the longitudinal direction discharges light to the outside of said light conductor, is continuously linear, and opposes both ends of said light conductor.

2. A linear beam irradiator as defined in claim 1, wherein said diffusing surface is disposed across a space not optically matching said light refraction & reflection area.

3. A linear beam irradiator as defined in claim 1, wherein the sectional area of said light conductor gradually diminishes from both ends toward the central part and becomes smallest at the central part.

4. A linear beam irradiator as defined in any one of claims 2, 3, and 1, wherein the cross-sectional shape of said light conductor is similar at any position in the longitudinal direction.

5. A linear beam irradiator as defined in claim 4, wherein the other side face in the longitudinal direction discharging the light of said light conductor is a plane perpendicular to both end faces of said light conductor.

6. A linear beam irradiator as defined in claim 1, wherein a concave groove is formed on the surface on one side in the longitudinal direction of said light conductor, and said light refraction & reflection area is formed at the bottom face of the concave groove.

7. A linear beam irradiator as defined in claim 6, wherein a connecting part is provided for connecting between said light conductor and said light refraction & reflection area.

8. A linear beam irradiator as defined in claim 7, wherein the cross-sectional shape of said light conductor of said connecting part is circular.

9. A linear beam irradiator as defined in claim 7, wherein said connecting part has a length and a diameter in the longitudinal direction satisfying the conditions for the light entering at both ends of the light conductor from the light source to be totally reflected at the outer wall of the light conductor.

10. A linear beam irradiator as defined in claim 7, wherein a light shielding layer for shielding the light from outside is provided at the outer circumference of said connecting part.

11. A linear beam irradiator as defined in claim 7, wherein a light diffusing layer for diffusing light is provided at the outer circumference of said connecting part.

12. A linear beam irradiator as defined in claim 7, wherein a light reflecting layer for reflecting light is provided at the outer circumference of said connecting part.

13. A linear beam irradiator as defined in claim 6, wherein said light refraction & reflection area and/or said diffusing surface are formed with a prescribed pattern on the surface of one side in the longitudinal direction of said light conductor.

14. A linear beam irradiator as defined in claim 13, wherein said prescribed pattern is such that the width of said light refraction & reflection area and/or said diffusing surface is constant over the entire part in the longitudinal direction of said light conductor.

15. A linear beam irradiator as defined in claim 14, wherein said prescribed pattern is such that said light refraction & reflection area and/or said diffusing surface of certain length in the longitudinal direction are disposed at certain intervals.

16. A linear beam irradiator as defined in claim 14, wherein said prescribed pattern is such that said light refraction & reflection area and/or said diffusing surface of certain length in the longitudinal direction gradually become narrower in interval from both ends toward the central part of said light conductor.

17. A linear beam irradiator as defined in claim 13, wherein the width of said prescribed pattern is such that said light refraction & reflection area and/or said diffusing surface gradually becomes wider from both ends toward the central part of said light conductor.

18. A linear beam irradiator as defined in claim 17, wherein said prescribed pattern is such that said light refraction & reflection area and/or said diffusing surface of certain length in the longitudinal direction are disposed at certain intervals.

19. A linear beam irradiator as defined in claim 1, wherein the cross-sectional shape of said light conductor is a curved surface and provided with the function of a lens.

20. A linear beam irradiator as defined in claim 19, wherein the cross-sectional shape of said light conductor is substantially circular.

21. A linear beam irradiator as defined in claim 19, wherein the cross-sectional shape said light conductor is substantially elliptical.

22. A linear beam irradiator as defined in claim 21, wherein the cross-sectional shape of said light conductor has a major axis and two focal points and includes a shape cut with a cutting line that is perpendicular to said major axis and passes through one of said two focal points.

23. A linear beam irradiator as defined in claim 22, wherein said light refraction & reflection area is provided on a plane formed in the longitudinal direction by said cutting line.

24. A linear beam irradiator as defined in claim 19, wherein the cross-sectional shape of said light conductor is a shape constructed with a part of 2 circles different in diameter, connected by two mutually tangential straight lines.

25. A linear beam irradiator as defined in claim 24, wherein said 2 circles consist of a first circle, in which said light refraction & reflection area is provided, and a second circle from which the light goes out, said first circle gradually diminishing in sectional area from both ends toward the central part in the longitudinal direction, and said second circle having a constant cross-sectional area in the longitudinal direction of said light conductor.

26. A linear beam irradiator comprising:
   a light conductor extending in a longitudinal direction, said light conductor having two ends and two side faces, and said light conductor having light permeability;
   a light refraction & reflection area having chopping wave surfaces, said light refraction & reflection area provided on a surface in the longitudinal direction of one side face of said light conductor;
   a diffusing surface covering said light refraction & reflection area; and
   a light source at one end of said light conductor,
   wherein light discharged from said light source is directed into said light conductor,
   wherein light refracted or reflected in said light refraction & reflection area is emitted in the form of a linear beam to the outside of said light conductor, and
   wherein the entirety of the other side face, in the longitudinal direction discharges light to the outside of said light conductor, is continuously linear, and opposes both ends of said light conductor.

27. A linear beam irradiator as defined in claim 26, wherein said diffusing surface is disposed across a space not optically matching said light refraction & reflection area.

28. A linear beam irradiator as defined in claim 26, wherein the sectional area of said light conductor gradually diminishes from one end at which said light source is disposed toward the other end.

29. A linear beam irradiator as defined in any one of claims 27, 28, and 26, wherein the cross-sectional shape of said light conductor is similar at any position in the longitudinal direction.

30. A linear beam irradiator as defined in claim 29, wherein the other side face in the longitudinal direction discharging the light of said light conductor is a plane perpendicular to one end face at which said light source is disposed of said light conductor.

31. A linear beam irradiator as defined in claim 26, wherein the cross-sectional shape of said light conductor is substantially circular.

32. A linear beam irradiator as defined in claim 31, wherein said light refraction & reflection area and/or said diffusing surface are formed with a prescribed pattern on the surface of one side in the longitudinal direction of said light conductor, and wherein said prescribed pattern is such that said light refraction & reflection area and/or said diffusing surface of certain length in the longitudinal direction are disposed at certain intervals.

33. A linear beam irradiator as defined in claim 32, comprising, on said other end where the light source is not disposed, a light terminal area having a cross-sectional shape that is identical to the other side face.

34. A linear beam irradiator as defined in claim 33, wherein a light shielding layer for shielding the light from outside or a light reflecting layer for reflecting light is provided at the outer circumference of said light terminal area.

35. A linear beam irradiator as defined in claim 26, wherein the cross-sectional shape of said light conductor is substantially elliptical.

36. A linear beam irradiator as defined in claim 35, wherein the cross-sectional shape of said light conductor has a major axis and two focal points and includes a shape cut with a cutting line that is perpendicular to said major axis and passes through one of said two focal points.

37. A linear beam irradiator as defined in claim 36, wherein said light refraction & reflection area is provided on a plane formed in the longitudinal direction by said cutting line.

38. A linear beam irradiator as defined in claim 26, wherein the cross-sectional shape of said light conductor is a shape constructed with a part of 2 circles different in diameter, connected by two mutually tangential straight lines.

39. A linear beam irradiator as defined in claim 38, wherein said 2 circles consist of a first circle, in which said light refraction & reflection area is provided, and a second circle from which the light goes out, said first circle gradually diminishing in sectional area from one end toward the other in the longitudinal direction, and said second circle having a constant cross-sectional area in the longitudinal direction of said light conductor.

40. A linear beam irradiator as defined in claim 26, wherein a concave groove is formed on the surface on one side in the longitudinal direction of said light conductor, and said light refraction & reflection area is formed at the bottom face of a concave groove.

41. A linear beam irradiator as defined in claim 40, wherein a connecting part is provided for connecting between said light conductor and said light refraction & reflection area.

42. A linear beam irradiator as defined in claim 41, wherein the cross-sectional shape of said connecting part is circular.

43. A linear beam irradiator as defined in claim 41, wherein said connecting part has a length and a diameter in the longitudinal direction satisfying the conditions for the light entering at one end of the light conductor from the light source to be totally reflected at the outer wall of the light conductor.

44. A linear beam irradiator as defined in claim 41, wherein a light shielding layer for shielding the light from outside is provided at the outer circumference of said connecting part.

45. A linear beam irradiator as defined in claim 41, wherein a light diffusing layer for diffusing light is provided at the outer circumference of said connecting part.

46. A linear beam irradiator as defined in claim 41, wherein a light reflecting layer for reflecting light is provided at the outer circumference of said connecting part.

47. A linear beam irradiator as defined in claim 40, wherein said light refraction & reflection area and/or said diffusing surface are formed with a prescribed pattern on the surface of one side in the longitudinal direction of said light conductor.

48. A linear beam irradiator as defined in claim 47, wherein said prescribed pattern is such that the width of said light refraction & reflection area and/or said diffusing surface is constant over the entire part in the longitudinal direction of said light conductor.

49. A linear beam irradiator as defined in claim 48, wherein said prescribed pattern is such that said light refraction & reflection area and/or said diffusing surface of certain length in the longitudinal direction are disposed at certain intervals.

50. A linear beam irradiator as defined in claim 48, wherein said prescribed pattern is such that said light refraction & reflection area and/or said diffusing surface of certain length in the longitudinal direction gradually become narrower in interval from one end toward the other of said light conductor.

51. A linear beam irradiator as defined in claim 47, wherein the width of said prescribed pattern is such that said light refraction & reflection area and/or said diffusing surface gradually becomes wider from one end toward the other of said light conductor.

52. A linear beam irradiator as defined in claim 51, wherein said prescribed pattern is such that said light refraction & reflection area and/or said diffusing surface of certain length in the longitudinal direction are disposed at certain intervals.

53. A linear beam irradiator as defined in claim 52, comprising, on said other end where the light source is not disposed, a light terminal area having a cross-sectional shape that is identical to the other side face.

54. A linear beam irradiator as defined in claim 53, wherein a light shielding layer for shielding the light from outside or a light reflecting layer for reflecting light is provided at the outer circumference of said light terminal area.

55. A linear beam irradiator. as defined in claim 53, wherein a light shielding layer for shielding the light from outside or a light diffusing layer for diffusing light or a light reflecting layer for reflecting light is provided at the outer circumference of said light terminal area.

56. A linear beam irradiator as defined in either one of claims 1 and 26, wherein a light emitting diode is used as said light source.

57. A linear beam irradiator as defined in claim 56, wherein said light emitting diode is mounted on a printed circuit board formed on a concave reflecting face.

58. A linear beam irradiator as defined in claim 57, wherein the shape of said concave reflecting face is an inverted truncated cone, and said light emitting diode is mounted on the bottom face of said inverted truncated cone.

59. A linear beam irradiator as defined in claim 58, wherein said light emitting diode and said light conductor comprise a transparent resin having the same index of refraction, and said light emitting diode and said light conductor are connected in a way to optically match with each other.

* * * * *